(12) United States Patent  (10) Patent No.: US 9,729,683 B2
Okuley  (45) Date of Patent: Aug. 8, 2017

(54) ELECTRONIC DEVICE SYSTEM WITH A MODULAR SECOND HOUSING

(71) Applicant: Intel Corporation, Santa Clara, CA (US)

(72) Inventor: James M. Okuley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/498,812

(22) Filed: Sep. 26, 2014

(65) Prior Publication Data

US 2016/0094691 A1  Mar. 31, 2016

(51) Int. Cl.
*H05K 7/00* (2006.01)
*H04M 1/02* (2006.01)
*G06F 1/16* (2006.01)
*H04M 1/04* (2006.01)

(52) U.S. Cl.
CPC ........ *H04M 1/0202* (2013.01); *G06F 1/1632* (2013.01); *G06F 1/1647* (2013.01); *H04M 1/0254* (2013.01); *G06F 1/166* (2013.01); *H04M 1/04* (2013.01)

(58) Field of Classification Search
CPC .................................................. G06F 1/1616
USPC ........................................ 361/679.01–679.03
See application file for complete search history.

(56) References Cited

U.S. PATENT DOCUMENTS

| D413,872 | S | 9/1999 | Jessen | |
|---|---|---|---|---|
| 6,980,420 | B2 * | 12/2005 | Maskatia | G06F 1/1616 248/917 |
| D557,698 | S | 12/2007 | Lye | |
| D590,404 | S | 4/2009 | Kim et al. | |
| D667,831 | S | 9/2012 | Stravitz | |
| D672,352 | S | 12/2012 | Gengler | |
| D676,853 | S | 2/2013 | Gengler | |
| D678,886 | S | 3/2013 | Heckler | |
| D692,010 | S | 10/2013 | Verghese | |
| D694,245 | S | 11/2013 | Sanz | |
| D697,069 | S | 1/2014 | Tak et al. | |
| D716,817 | S | 11/2014 | Yang | |

(Continued)

FOREIGN PATENT DOCUMENTS

WO   2016048565 A1   3/2016

OTHER PUBLICATIONS

International Search Report and Written Opinion in International Application PCT/US2015/047051 mailed Nov. 27, 2015.

(Continued)

*Primary Examiner* — Jerry Wu

(74) *Attorney, Agent, or Firm* — Patent Capital Group

(57) ABSTRACT

Particular embodiments described herein provide for an electronic device, such as a tablet, that includes a circuit board coupled to a plurality of electronic components (which includes any type of components, elements, circuitry, etc.). One particular example implementation of the electronic device may include a first housing and a second housing removably coupled to the first housing, where the second housing is configured to function as a stand for the first housing. The stand configuration can allow for user desired viewing of a first display located on the first housing and of a second display located on the second housing. Further, the second housing can be removed from the first housing and replaced with a different second housing.

20 Claims, 16 Drawing Sheets

(56) References Cited

U.S. PATENT DOCUMENTS

| | | |
|---|---|---|
| D732,543 S | 6/2015 | Westrup et al. |
| 2002/0113751 A1 | 8/2002 | Knopf |
| 2007/0076861 A1* | 4/2007 | Ju .................. H04M 1/0247 379/433.01 |
| 2007/0164923 A1 | 7/2007 | Kanai et al. |
| 2009/0052296 A1 | 2/2009 | Tracy et al. |
| 2010/0177047 A1* | 7/2010 | Brenneman .......... G06F 1/1616 345/173 |
| 2011/0299235 A1 | 12/2011 | Liu et al. |
| 2014/0009877 A1 | 1/2014 | Okamoto et al. |
| 2014/0165366 A1 | 6/2014 | Hochman |

OTHER PUBLICATIONS

USPTO Restriction Requirement in U.S. Appl. No. 29/513,136, mailed on Feb. 22, 2016.
USPTO Non-Final Office Action in U.S. Appl. No. 29/513,136 mailed on May 11, 2016; 4 pages.
USPTO Notice of Allowance in U.S. Appl. No. 29/513,136 mailed on Oct. 21, 2016; 16 pages.
International Preliminary Report on Patentability issued in PCT Application No. PCT/US2015/047051 on Mar. 28, 2017; 9 pages.

* cited by examiner

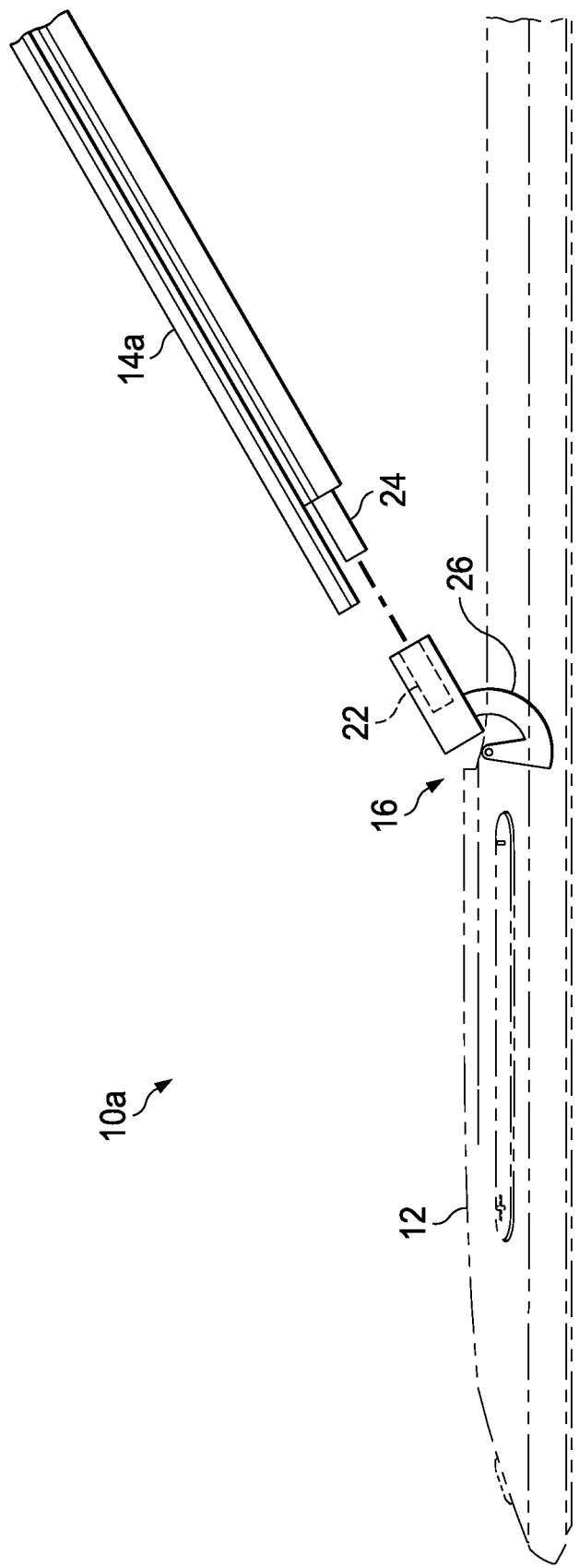

US 9,729,683 B2

ELECTRONIC DEVICE SYSTEM WITH A MODULAR SECOND HOUSING

TECHNICAL FIELD

Embodiments described herein generally relate to the field of electronic devices and, more particularly, to a modular second housing for an electronic device.

BACKGROUND

End users have more electronic device choices than ever before. A number of prominent technological trends are currently afoot (e.g., more computing devices, more detachable displays, etc.), and these trends are changing the electronic device landscape. One of the technological trends is a tablet with a stand. In many instances, the stand can only support the tablet and cannot be removed. Hence, there is a challenge in providing an electronic device that allows a stand to be removed and replaced with a device that can provide functions in addition to or other than a stand.

BRIEF DESCRIPTION OF THE DRAWINGS

Embodiments are illustrated by way of example and not by way of limitation in the FIGURES of the accompanying drawings, in which like references indicate similar elements and in which:

FIG. 2C is a simplified schematic diagram illustrating an embodiment of an electronic device in accordance with one embodiment of the present disclosure;

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

An electronic device is provided in one example embodiment and includes a plurality of electronic components (which can include any type of components, elements, circuitry, etc.). One particular example implementation of the electronic device may include a first housing and a second housing removably coupled to the first housing, where the second housing is configured to function as a stand for the first housing. The first housing can include a first display and the second housing can include a second display and the stand configuration can allow for a user desired viewing of the first display and of the second display.

In other embodiments, an interconnect can electrical couple the first housing and the second housing. The second housing can be removed from the first housing and replaced with a different second housing, where the different second housing uses the same interconnect as the second housing. In certain examples, the different second housing does not include any electronics. The first housing can be a standalone tablet and the second housing can be a standalone electronic device.

EXAMPLE EMBODIMENTS

The following detailed description sets forth example embodiments of apparatuses, methods, and systems relating to detachable display configurations for an electronic device. Features such as structure(s), function(s), and/or characteristic(s), for example, are described with reference to one embodiment as a matter of convenience; various embodiments may be implemented with any suitable one or more of the described features.

Figure 1A:
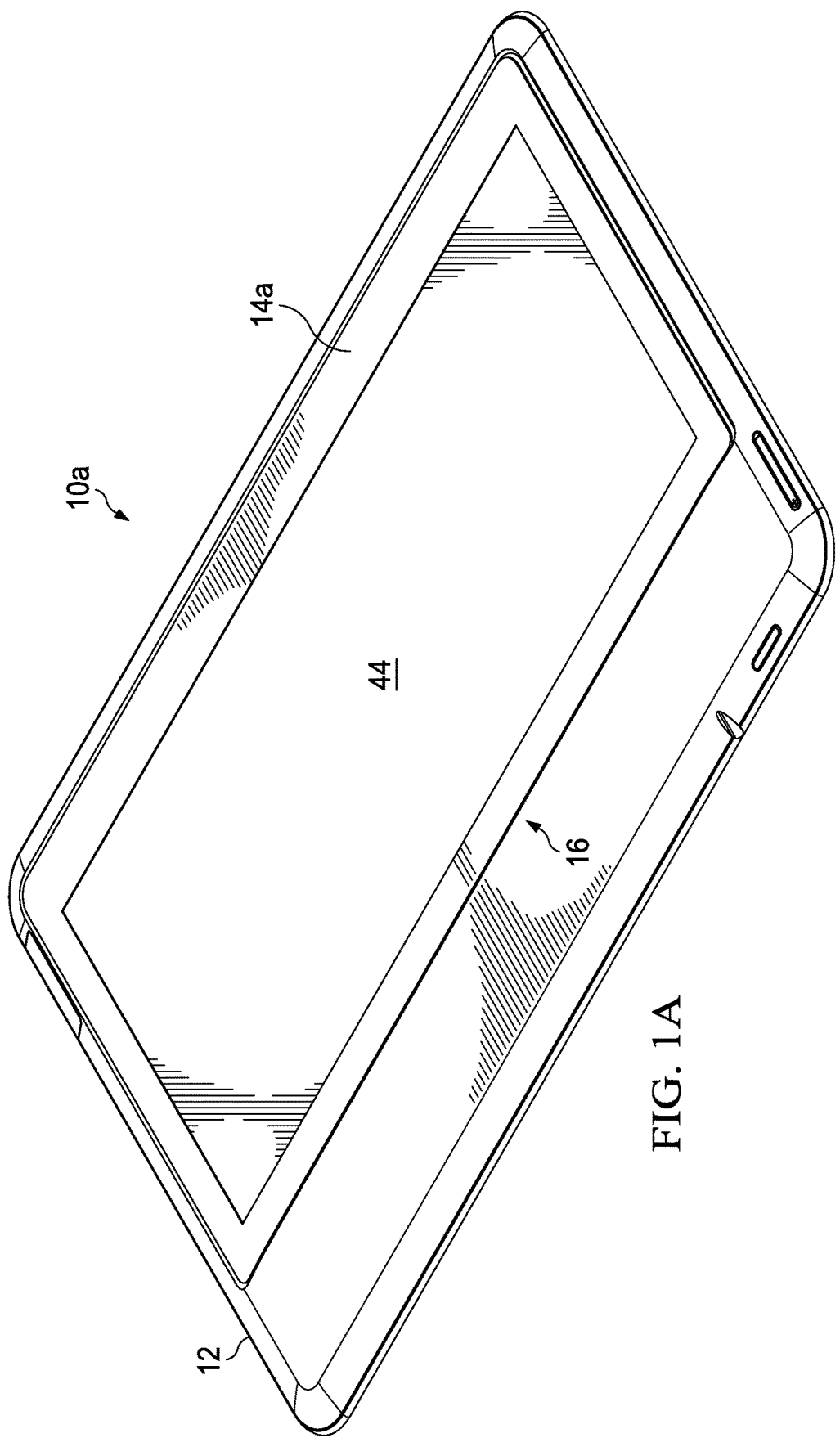
FIG. 1A is a simplified schematic diagram illustrating an embodiment of an electronic device, in accordance with one embodiment of the present disclosure.

FIG. 1A is a simplified orthographic view illustrating an embodiment of an electronic device 10a in a tablet configuration in accordance with one embodiment of the present disclosure. Electronic device 10a may include a first housing 12, a second housing 14a, and a hinge 16. Second housing 14a can include a second housing display 44. Hinge 16 can define an axis of rotation that is shared between first housing 12 and second housing 14a.

In one or more embodiments, second housing display 44 can be a liquid crystal display (LCD) display screen, a light-emitting diode (LED) display screen, an organic light-emitting diode (OLED) display screen, a plasma display screen, or any other suitable display screen system. Second housing display 44 may be a touchscreen that can detect the presence and location of a touch within the display area. In another embodiment, second housing 14a may include a battery and various electronics (e.g., processor, memory, etc.) to allow second housing 14a to operate as a standalone tablet. In another embodiment, second housing 14a may include a wireless module (e.g., Wi-Fi module, Bluetooth module, etc.). In yet another embodiment, second housing 14a may include a camera, a microphone, and speakers.

In one or more embodiments, electronic device 10a is a tablet computer. In still other embodiments, electronic device 10a may be any suitable electronic device having a display such as a mobile device, a tablet device (e.g., i-Pad™), Phablet™, a personal digital assistant (PDA), a smartphone, an audio system, a movie player of any type, a computer docking station, etc. In yet another embodiment, most of the electronics (e.g., processor, memory, etc.) for electronic device 10a reside in first housing 12.

Figure 1B:
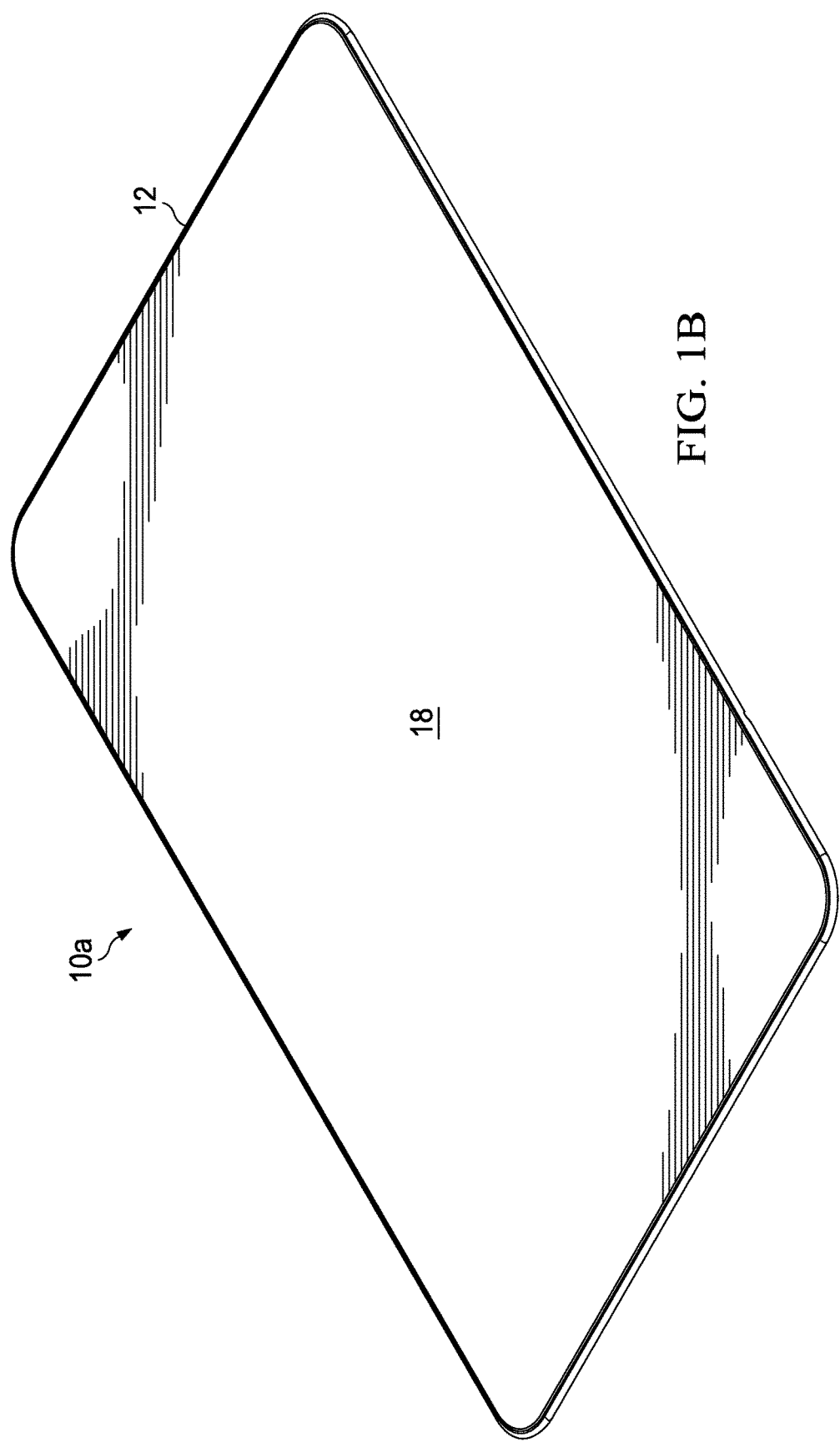
FIG. 1B is a simplified schematic diagram illustrating an embodiment of an electronic device, in accordance with one embodiment of the present disclosure.

Turning to FIG. 1B, FIG. 1B is a simplified orthographic view of electronic device 10a in accordance with one embodiment of the present disclosure. First housing 12 can include a first housing display 18. In one or more embodiments, first housing display 18 can be a liquid crystal display (LCD) display screen, a light-emitting diode (LED) display screen, an organic light-emitting diode (OLED) display screen, a plasma display screen, or any other suitable display screen system. First housing display 18 may be a touchscreen that can detect the presence and location of a touch within the display area. In another embodiment, first housing 12 may include a battery and various electronics (e.g., processor, memory, etc.) to allow first housing 12 to operate as a standalone tablet. In another embodiment, first housing 12 may include a wireless module (e.g., Wi-Fi module, Bluetooth module, etc.). In yet another embodiment, first housing 12 may include a camera, a microphone, and speakers.

Figure 1C:
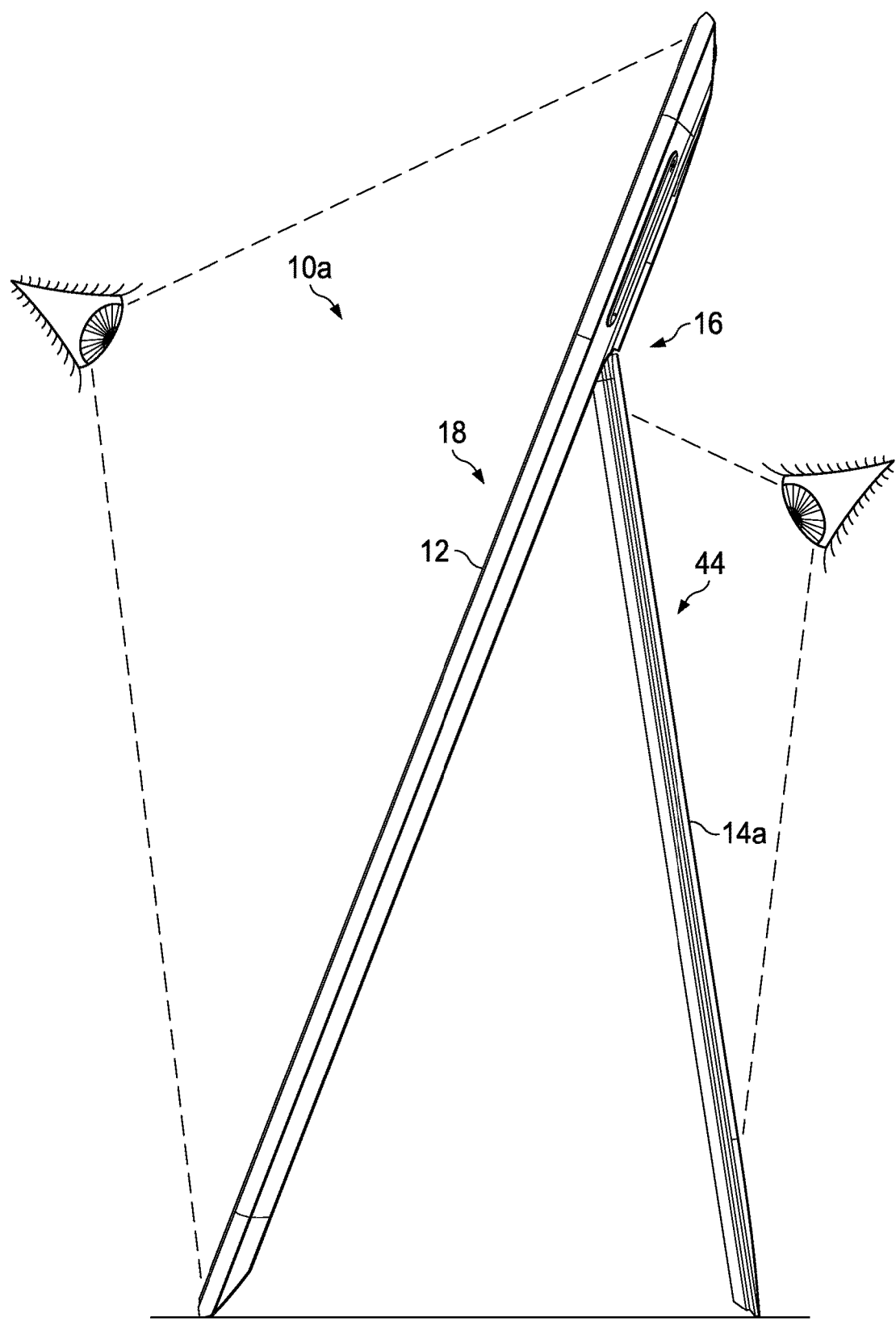
FIG. 1C is a simplified schematic diagram illustrating an embodiment of an electronic device, in accordance with one embodiment of the present disclosure.

Turning to FIG. 1C, FIG. 1C is a simplified schematic diagram illustrating an embodiment of electronic device 10a in a stand mode in accordance with one embodiment of the present disclosure. As illustrated, second housing 14a has been rotated on hinge 16 away from first housing 12. Second housing 14a can function as a stand that supports first housing 12. The angle of second housing 14a can be configured to provide a proper or user desired viewing angle of first housing display 18 and a proper or user desired viewing angle of second housing display 44.

Figure 1D:
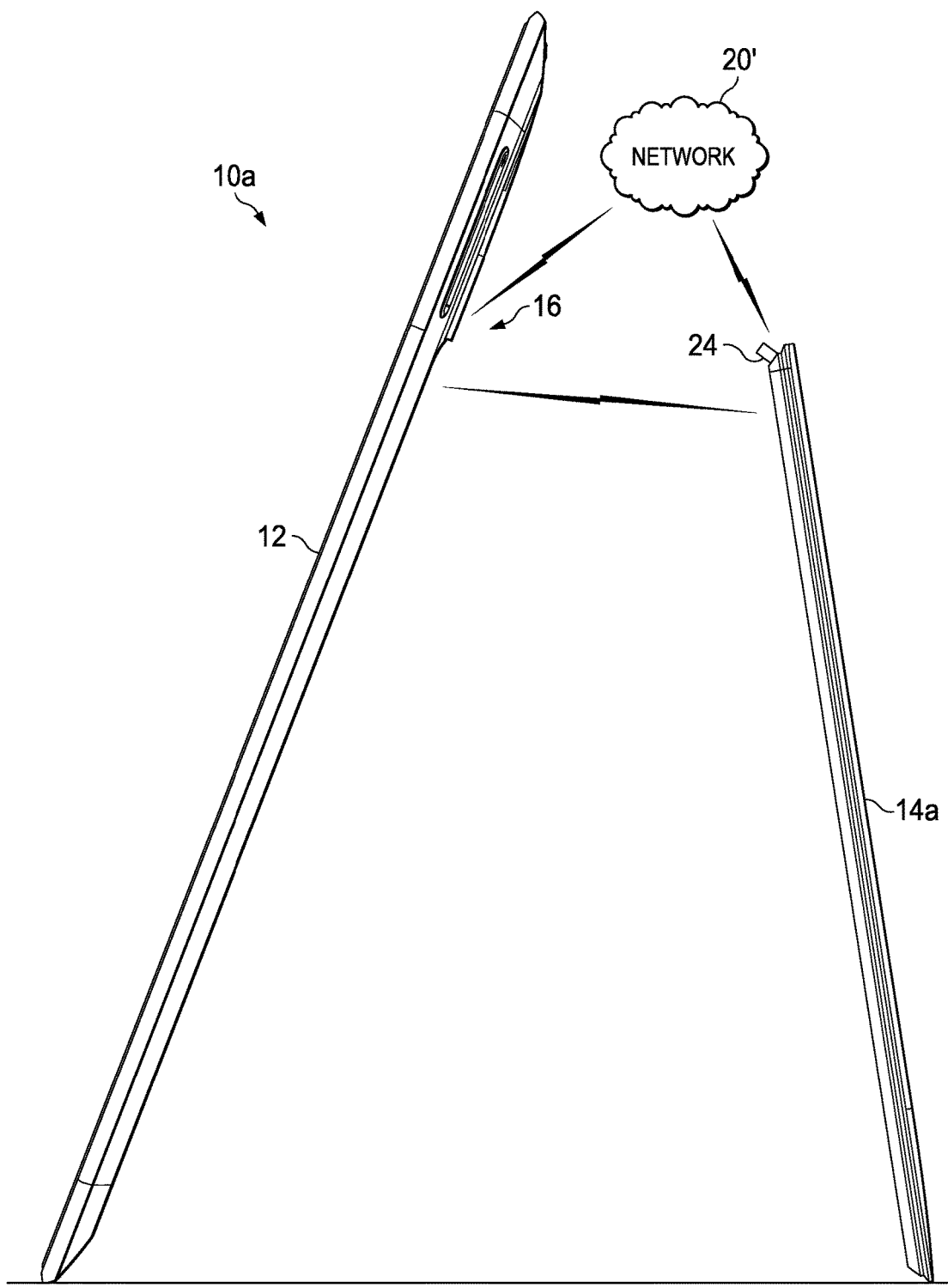
FIG. 1D is a simplified schematic diagram illustrating an embodiment of an electronic device, in accordance with one embodiment of the present disclosure.

Turning to FIG. 1D, FIG. 1D is a simplified schematic diagram illustrating an embodiment of an electronic device in a detachable configuration in accordance with one embodiment of the present disclosure. As illustrated, second housing 14a has been separated from first housing 12. Second housing 14a may include a second housing interconnect 24 that, when second housing 14a is connected to first housing 12, electrical signals can pass between first housing 12 and second housing 14a. In an embodiment, second housing 14a can include a battery and various electronics (e.g., processor, memory, etc.) to allow second housing 14a to operate as a standalone device. In another embodiment, second housing 14a may include a wireless module (e.g., Wi-Fi module, Bluetooth module, etc.) that allows second housing 14a to communicate with first housing 12 when second housing 14a is removed from first housing 12.

Figure 1E:
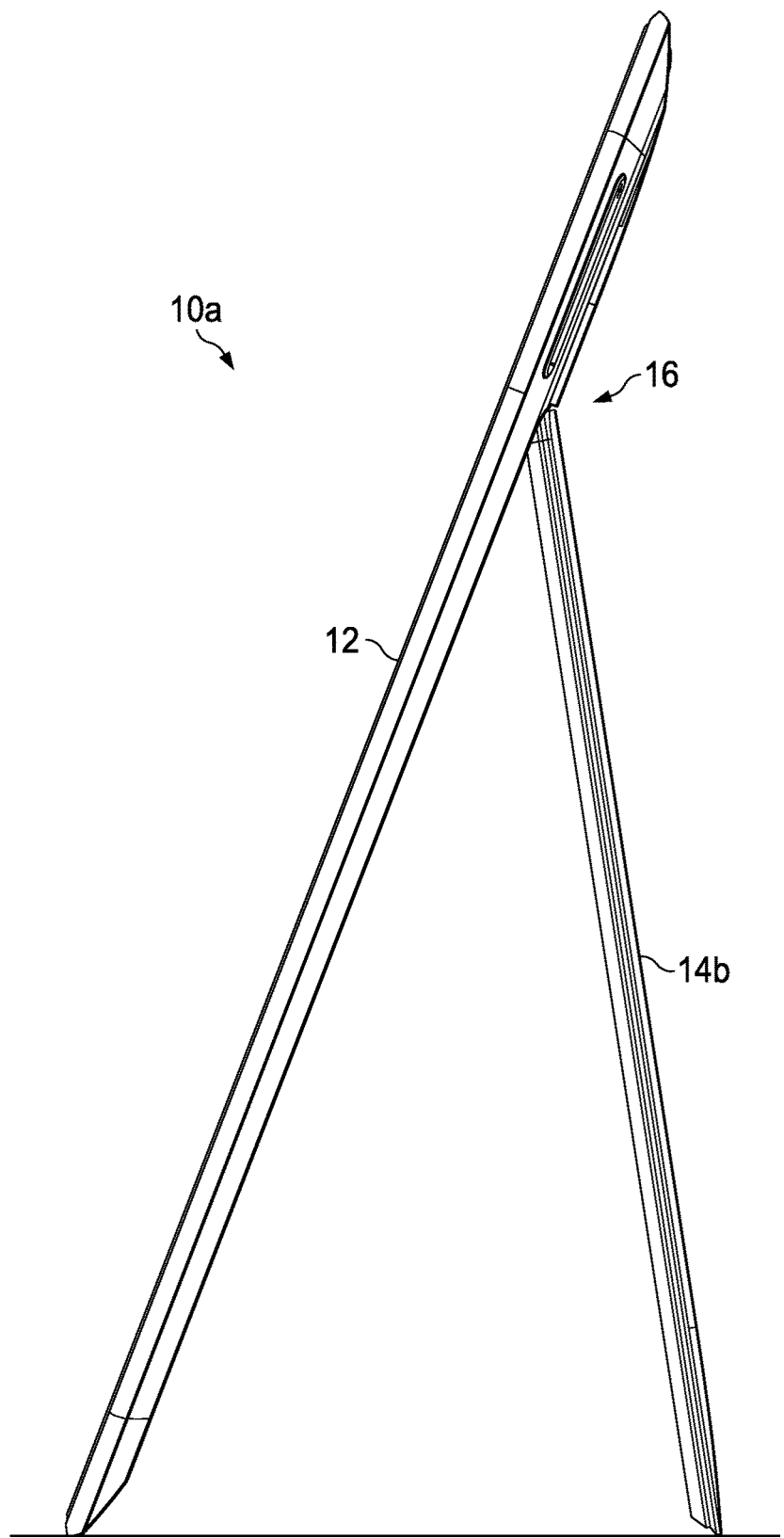
FIG. 1E is a simplified schematic diagram illustrating an embodiment of an electronic device, in accordance with one embodiment of the present disclosure.
Figure 1F:
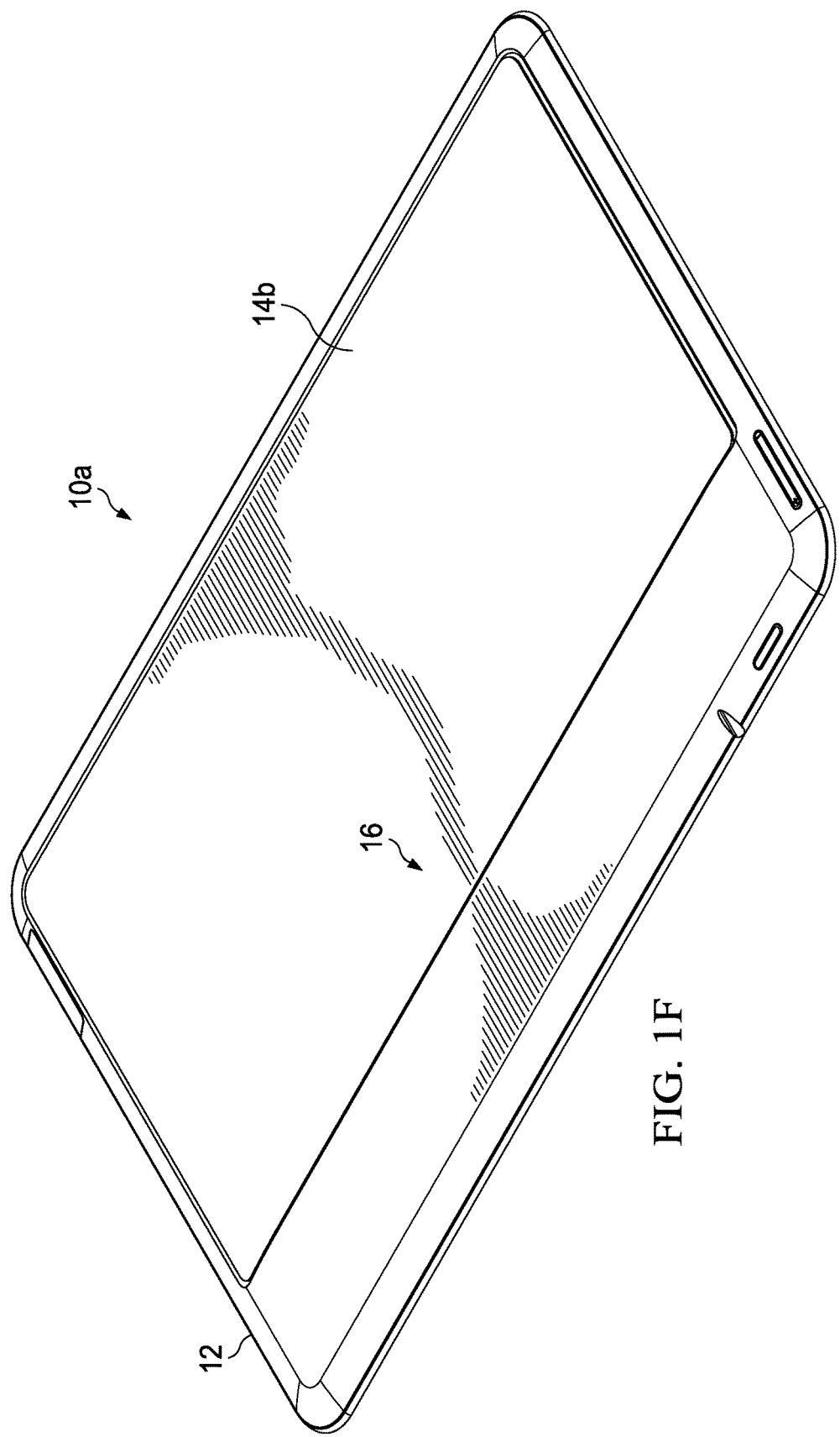
FIG. 1F is a simplified schematic diagram illustrating an embodiment of an electronic device, in accordance with one embodiment of the present disclosure.

Turning to FIG. 1E, FIG. 1E is a simplified schematic diagram illustrating an embodiment of electronic device 10a in a stand mode in accordance with one embodiment of the present disclosure. As illustrated in FIG. 1E, second housing 14a (not shown) has been detached from first housing 12 and replaced with second housing 14b. Turning to FIG. 1F, FIG. 1F is a simplified orthographic view illustrating an embodiment of an electronic device 10a in a tablet configuration in accordance with one embodiment of the present disclosure. As illustrated in FIG. 1F second housing 14a (not shown) has been detached from first housing 12 and replaced with second housing 14b.

FIGS. 1A-1F illustrate the configurability of electronic device 10a. For example, first housing 12 may be connected to second housing 14a in a tablet configuration or a stand configuration. In addition, second housing 14a may be removed from first housing 12 and second housing 14a may operate as a standalone electronic device. Also, second housing 14a may be removed from first housing 12 and replaced with a different second housing 14b. Second housing 14b may include a secondary display, an additional battery, a 3-D depth camera, a high megapixel camera, speakers, etc. This allows for a common chassis (first housing 12) that can be fitted with a variety of stand options to support different feature sets as well as aftermarket add-on accessories that become fully integrated into the form factor of electronic device 10a.

In general terms, electronic device 10a may be configured to provide a variety of second housings coupled to the first housing at a hinge. The hinge can be configured such that the second housing and the first housing can be separated. The first housing can include a first housing interconnect and each second housing can include a mating second housing interconnect. This allows a variety of second housings to be attached to the first housing such that the overall system can be configured to operate in a wide variety of configurations.

For purposes of illustrating certain example features of electronic device 10a, the following foundational information may be viewed as a basis from which the present disclosure may be properly explained. There currently are no electronic devices on the market with fully integrated interchangeable stands that include electronic components or secondary displays. In addition, current devices sometimes integrate a secondary display into the back of the lid of a laptop or on the back of a phone. These devices are not configured to provide a proper viewing angle of both screens at the same time. Further, current devices for social broadcasting often require a user to adjust the angle of the main display to assure the secondary display on the back of the main display is not angled too far towards the electronic device. The existing devices typically make the user compromise the best viewing angle of the main display in order to allow other users to view the secondary display and do not allow for proper viewing of both displays.

Particular embodiments described herein provide for an electronic device, such as a notebook computer, laptop, cellphone, or other mobile device that includes a circuit board coupled to a plurality of electronic components (which includes any type of components, elements, circuitry, etc.). The electronic device may also include a first housing coupled to a removable second housing at a hinge that includes an interconnect. For example, the hinge can include connectors and mechanical retentions to provide an electrical connection between the first housing and the second housing.

In an embodiment, the interconnect may be a printed circuit board (PCB) interconnector, a USB connector, pogo pin connector, a wireless interface (including a wireless energy transmission module), or other type of docking connector that can facilitate an electrical connection between the first housing and the second housing. A locking mechanism, such as a mechanical locking snap feature, can mitigate detachment during general usage. The mechanical snap feature may include a mechanical or electrical release to release the second housing and allow for easy interchangeability. The snap feature may also be implemented with magnets. The removable second housing and interconnect enables various possible second housing options such as one or more secondary displays, an integrated battery, an additional camera or a camera with a high megapixel, perceptual computing world facing 3-D depth camera, integrated Pico projector, speakers, etc.

The hinge can also be configured to allow the second housing to function as a support stand for the electronic device. When the electronic device is placed on a table with the second housing rotated away from the first housing, a user can interact with a touchscreen on either side of the system at an easy to use ergonomic angle for sharing or broadcasting information. The angle of the second housing can simultaneously support a user desired viewing angle of the first housing and a user desired viewing angle of the second housing. The electronic device can be configured to allow for an effective hinge and connection capability that provides an orientation flexibility and a suitable connection to enable configurability.

Figure 2A:
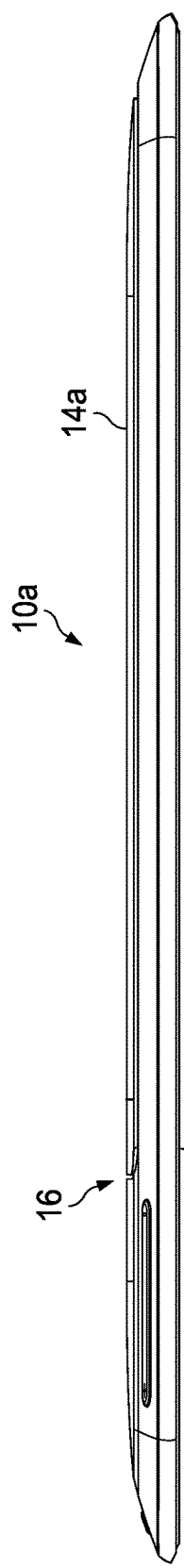
FIG. 2A is a simplified schematic diagram illustrating an embodiment of an electronic device in accordance with one embodiment of the present disclosure.
Figure 2B:
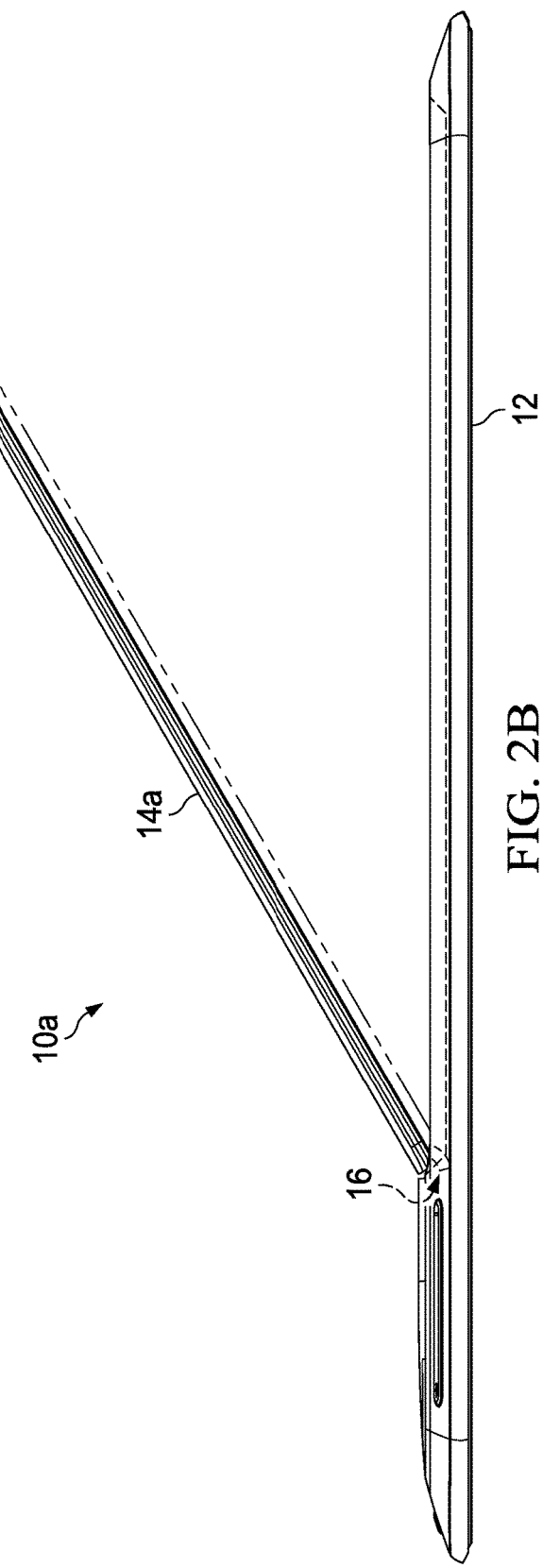
FIG. 2B is a simplified schematic diagram illustrating an embodiment of an electronic device in accordance with one embodiment of the present disclosure.

Turning to FIG. 2A, FIG. 2A is a simplified schematic diagram illustrating an embodiment of electronic device 10a, in accordance with one embodiment of the present disclosure. As illustrated in FIG. 2A, first housing 12 can include hinge 16. Second housing 14a can be removably connected to first housing 12 using hinge 16. Turning to FIG. 2B, FIG. 2B is a simplified schematic diagram illustrating an embodiment of electronic device 10a, in accordance with one embodiment of the present disclosure. As illustrated in FIG. 2B, second housing 14a has been rotated away from first housing 12 using hinge 16.

Turning to FIG. 2C, FIG. 2C is a simplified schematic diagram illustrating an embodiment of electronic device 10a, in accordance with one embodiment of the present disclosure. As illustrated in FIG. 2C, second housing 14a has been separated from first housing 12. Hinge 16 can include a first housing interconnect 22 and a rotation means 26 to allow second housing 14a to rotate relative to first housing 12. First housing interconnect 22 may be a printed circuit board (PCB) interconnector, a USB connector, pogo pin connector, a wireless interface (including a wireless energy transmission module), or other type of docking connector that can facilitate an electrical connection between first housing 12 and second housing 14a.

Figure 3:
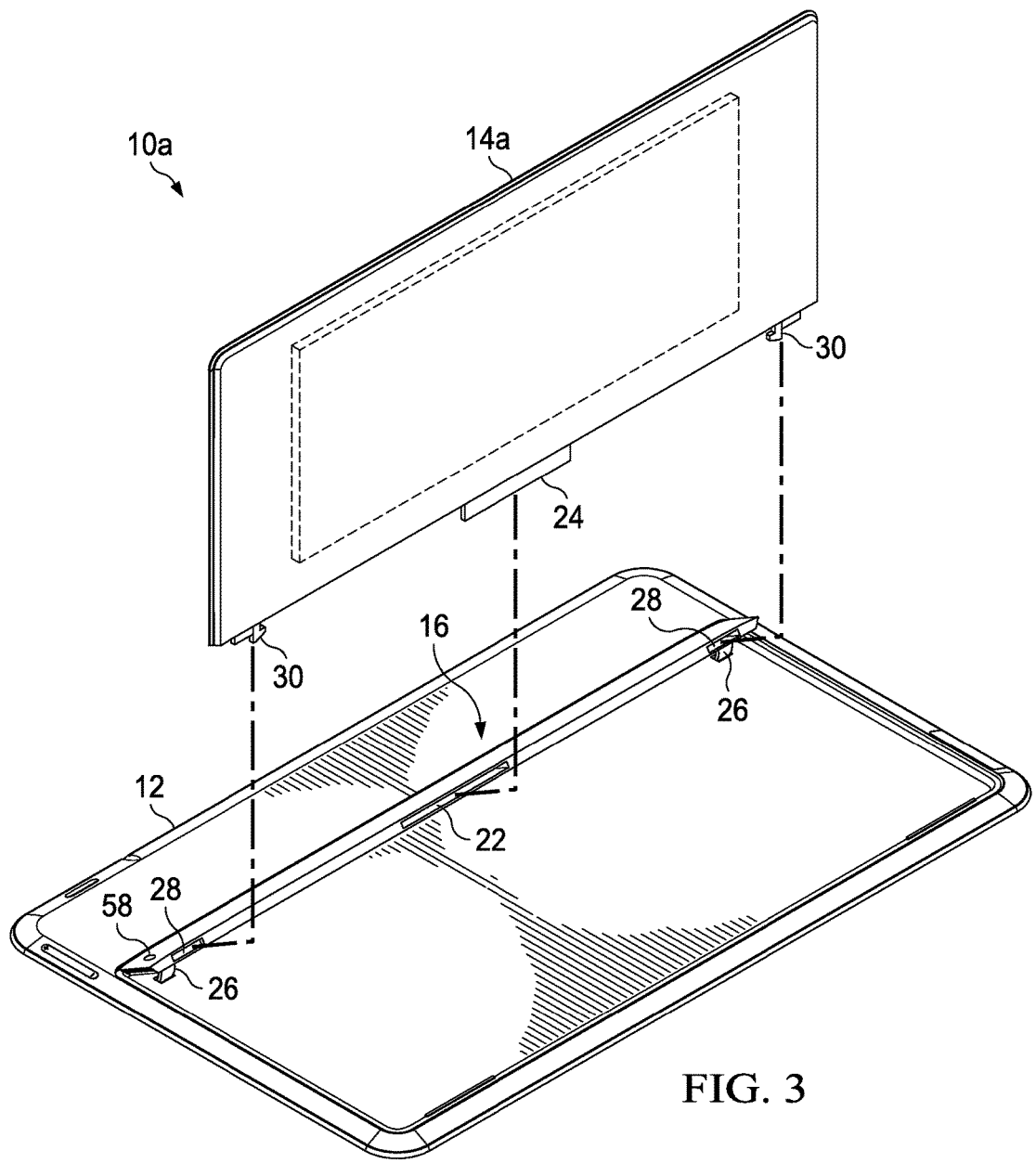
FIG. 3 is a simplified schematic diagram illustrating an embodiment of an electronic device in accordance with one embodiment of the present disclosure.

Turning to FIG. 3, FIG. 3 is a simplified schematic diagram illustrating an embodiment of a portion of electronic device 10a, in accordance with one embodiment of the present disclosure. In an embodiment, hinge 16 can include first housing interconnect 22, rotation means 26, a first housing coupler 28, and a release 58. Second housing 14a can include second housing interconnect 24 and a second housing coupler 30. Second housing interconnect 24 is configured to connect to first housing interconnect 22 and pass an electrical current and signals between first housing 12 and second housing 14a, to recharge an on-board battery or capacitor, power any number of items (e.g., a wireless module, camera, speakers, etc.), and provide a communication path between first housing 12 and second housing 14a. First housing coupler 28 and second housing coupler 30 can be configured to releasable couple first housing 12 to second housing 14a (e.g., a securing mechanism that can include hooks, magnetic elements, etc.). Release 58 can be configured to release or uncouple second housing 14a from first housing 12 when activated. Release 58 can be activated (e.g., by pushing or sliding) such that release 58 releases second housing 14a from first housing 12.

Figure 4:
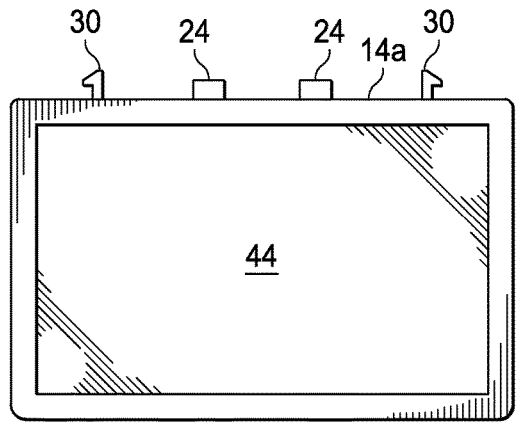
FIG. 4 is a simplified schematic diagram illustrating an embodiment of a portion of an electronic device, in accordance with one embodiment of the present disclosure.

Turning to FIG. 4, FIG. 4 is a simplified schematic diagram illustrating an embodiment of second housing 14a, in accordance with one embodiment of the present disclosure. In an embodiment, second housing 14a can include two second housing interconnects 24. Not shown are two mating first housing interconnects 22 configured to connect to the illustrated two second housing interconnects 24 and pass an electrical current and signals between first housing 12 and second housing 14a.

Figure 5:
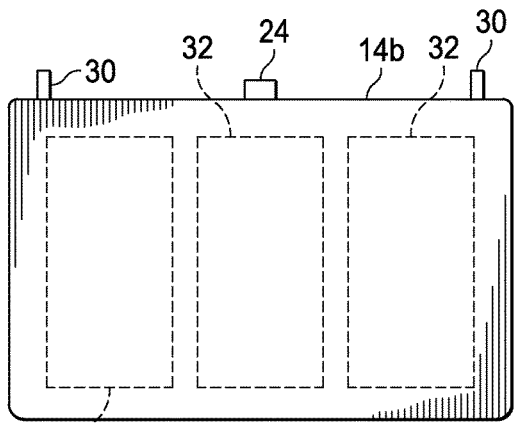
FIG. 5 is a simplified schematic diagram illustrating an embodiment of a portion of an electronic device, in accordance with one embodiment of the present disclosure.

Turning to FIG. 5, FIG. 5 is a simplified schematic diagram illustrating an embodiment of second housing 14b, in accordance with one embodiment of the present disclosure. In an embodiment, second housing 14b can include one or more batteries 32. Second housing 14b can be used when an additional power supply for electronic device 10a is desired. In such an example, second housing 14a can be removed from first housing 12 and second housing 14b can be coupled with first housing 12.

Figure 6:
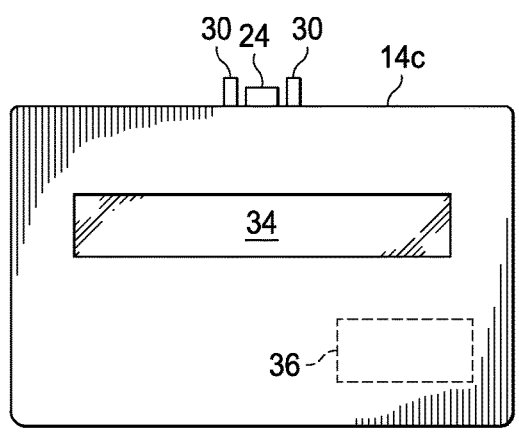
FIG. 6 is a simplified schematic diagram illustrating an embodiment of a portion of an electronic device in accordance with one embodiment of the present disclosure.

Turning to FIG. 6, FIG. 6 is a simplified schematic diagram illustrating an embodiment of second housing 14c, in accordance with one embodiment of the present disclosure. In an embodiment, second housing 14c can include a notification display 34 and a wireless module 36. Notification display 34 can be configured to display scrolling text such as information about received text messages or about a song that is currently being played on electronic device 10a.

Figure 7:
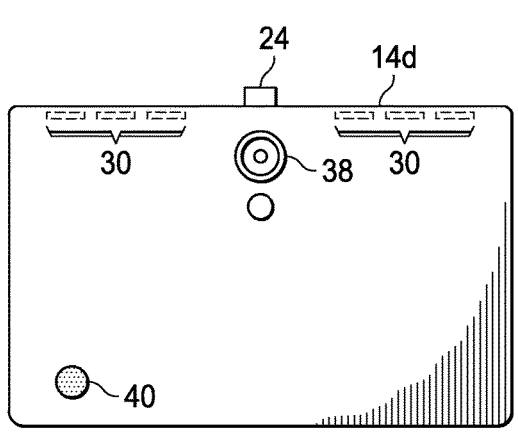
FIG. 7 is a simplified schematic diagram illustrating an embodiment of a portion of an electronic device, in accordance with one embodiment of the present disclosure.

Turning to FIG. 7, FIG. 7 is a simplified schematic diagram illustrating an embodiment of second housing 14d, in accordance with one embodiment of the present disclosure. In an embodiment, second housing 14d can include one or more camera lenses 38 and a microphone 40. Second housing 14d may be used when a user wants a higher resolution camera than the one that may be included on first housing 12 or when a user wants to add a video recorder to electronic device 10a. In such an example, second housing 14a can be removed and second housing 14c can be coupled with first housing 12.

Figure 8:
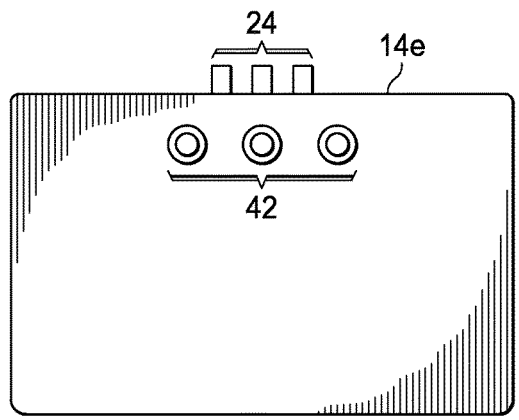
FIG. 8 is a simplified schematic diagram illustrating an embodiment of a portion of an electronic device in accordance with one embodiment of the present disclosure.

Turning to FIG. 8, FIG. 8 is a simplified schematic diagram illustrating an embodiment of second housing 14e, in accordance with one embodiment of the present disclosure. In an embodiment, second housing 14e can include a depth sensor 42. Depth sensor 42 may be used when a user wants to add 3D picture or 3D video capabilities to electronic device 10a. In such an example, second housing 14a can be removed from first housing 12 and second housing 14e can be coupled with first housing 12.

Figure 9:
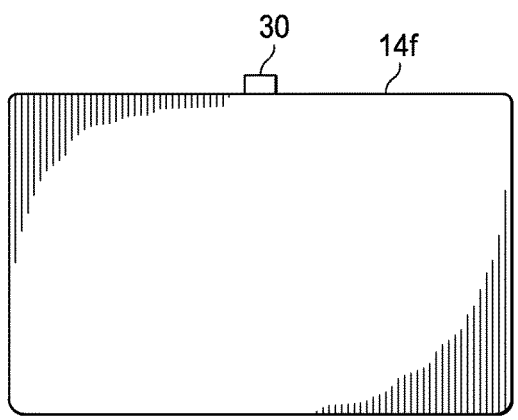
FIG. 9 is a simplified schematic diagram illustrating an embodiment of a portion of an electronic device in accordance with one embodiment of the present disclosure.

Turning to FIG. 9, FIG. 9 is a simplified schematic diagram illustrating an embodiment of second housing 14f, in accordance with one embodiment of the present disclosure. In an embodiment, second housing 14f can be void of any electronics and may be comprised of a lightweight material such as plastic. Second housing 14f may be used when a user wants electronic device 10a to be as light as possible for travel. In such an example, second housing 14a can be removed from first housing 12 and second housing 14f can be coupled with first housing 12. Because there are not any electronics included in second housing 14f, second housing 14f does not need second housing interconnect 24 and may only include second housing coupler 30 to couple second housing 14l to first housing 12.

Figure 10:
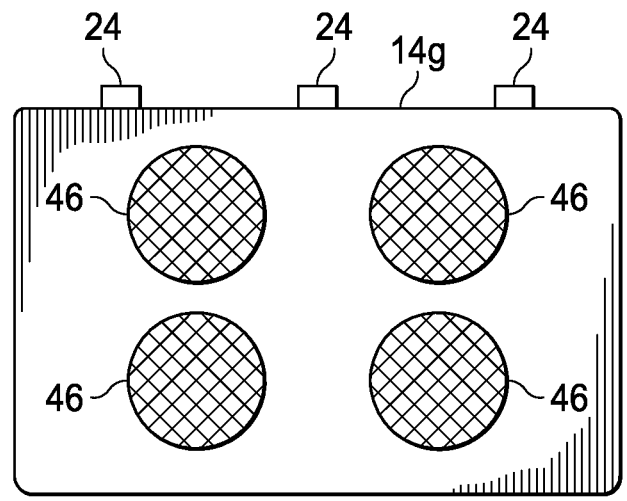
FIG. 10 is a simplified schematic diagram illustrating an embodiment of a portion of an electronic device in accordance with one embodiment of the present disclosure.

Turning to FIG. 10, FIG. 10 is a simplified schematic diagram illustrating an embodiment of second housing 14g, in accordance with one embodiment of the present disclosure. In an embodiment, second housing 14g can include one or more speakers 46. Second housing 14g can be used when additional sound output capability for electronic device 10a is desired. In such an example, second housing 14a can be removed from first housing 12 and second housing 14g can be coupled with first housing 12.

Note that the illustrated second housings are used as examples only and the examples provided should not limit the scope or inhibit the broad teachings of the configurable electronic device as potentially applied to a myriad of other architectures. For example, second housing could include a video project, motion sensor, etc. Also note that the illustrated second housing interconnect 24 and second housing coupler 30 are used as examples only and the examples provided should not limit the scope or inhibit the broad teachings of the configurable electronic device as potentially applied to a myriad of other architectures.

Using first housing interconnect 22 and second housing interconnect 24, an electrical current and signals can be passed from/to first housing 12 to/from second housing 14a to recharge an on-board battery or capacitor, power any number of items (e.g., a wireless module, camera, speakers, etc.), and provide a communication path between first housing 12 and second housing 14a (or second housing 14b-g, depending on which one is coupled to first housing 12). In other examples, electrical current and signals can be passed through a plug-in connector (e.g., whose male side protrusion connects to first housing 12 and whose female side connects to second housing 14a or vice-verse). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10a. [Thunderbolt™ and the Thunderbolt logo are trademarks of Intel Corporation in the U.S. and/or other countries.]. Virtually any other electrical connection methods could be used and, thus, are clearly within the scope of the present disclosure.

Figure 11A:
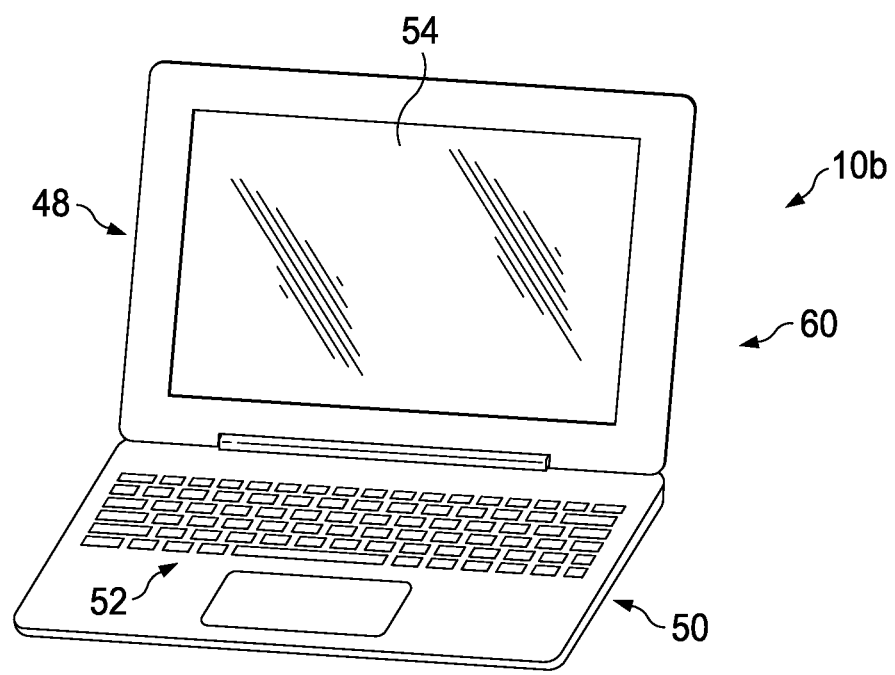
FIG. 11A is a simplified schematic diagram illustrating an embodiment of an electronic device in accordance with one embodiment of the present disclosure.

Turning to FIG. 11A, FIG. 11A is a simplified schematic diagram illustrating an embodiment of an electronic device 10b, in accordance with one embodiment of the present disclosure. In an embodiment, electronic device 10b can include a base device 60. Base device 60 can include a display portion 48 and a keyboard portion 50. Display portion 48 can include a display 54. Keyboard portion 50 can include a keyboard 52. In one or more embodiments, electronic device 10b is a notebook computer or laptop computer. Display 54 can be a liquid crystal display (LCD) display screen, a light-emitting diode (LED) display screen, an organic light-emitting diode (OLED) display screen, a plasma display screen, or any other suitable display screen system. Display 54 may be a touchscreen that can detect the presence and location of a touch within the display area.

Figure 11B:
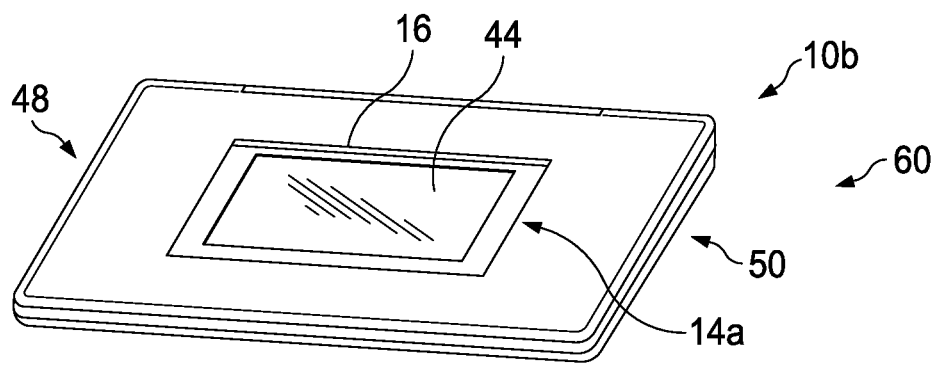
FIG. 11B is a simplified schematic diagram illustrating an embodiment of an electronic device in accordance with one embodiment of the present disclosure.
Figure 11C:
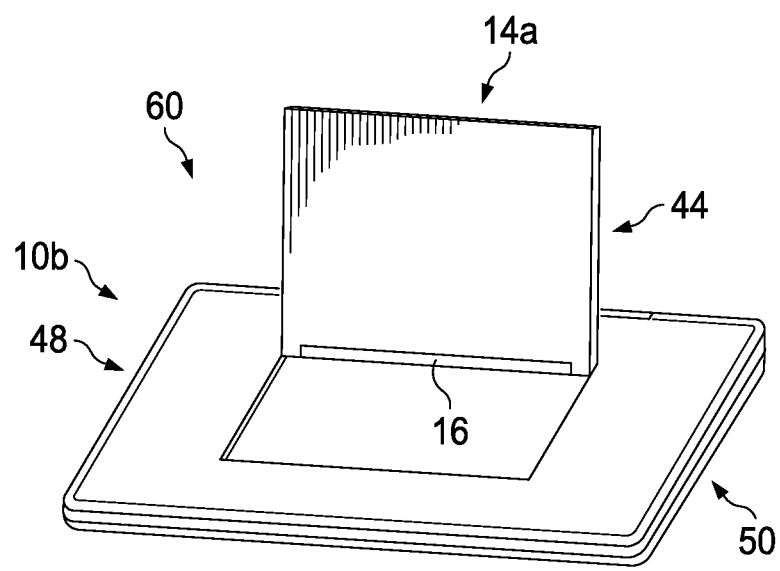
FIG. 11C is a simplified schematic diagram illustrating an embodiment of an electronic device in accordance with one embodiment of the present disclosure.

Turning to FIG. 11B, FIG. 11B is a simplified schematic diagram illustrating an embodiment of electronic device 10b, in accordance with one embodiment of the present disclosure. In an embodiment, electronic device 10b can include second housing 14a and hinge 16. Turning to FIG. 11C, FIG. 11C is a simplified schematic diagram illustrating an embodiment of electronic device 10b, in accordance with one embodiment of the present disclosure. As illustrated in FIG. 11C, second housing 14a has been rotated away from display portion 48 using hinge 16.

Figure 11D:
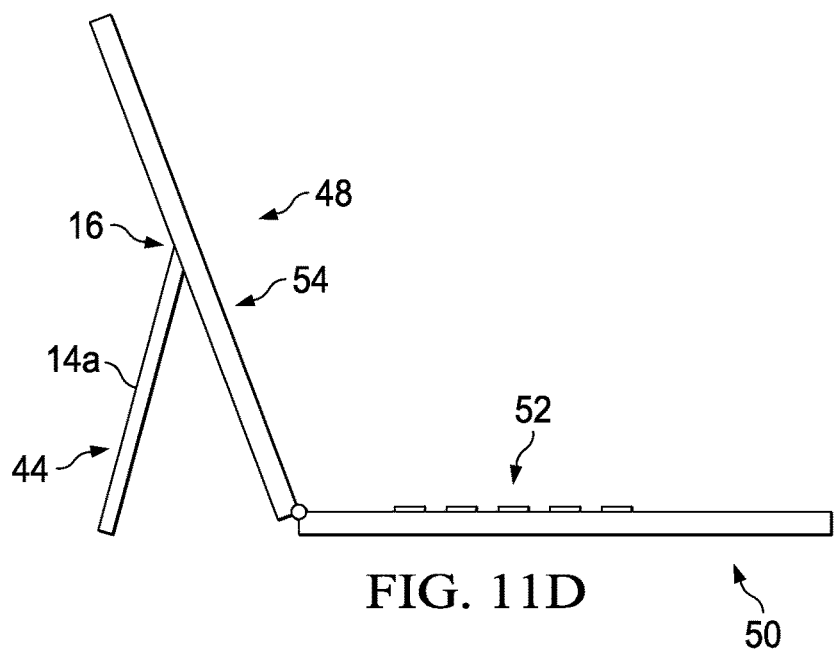
FIG. 11D is a simplified schematic diagram illustrating an embodiment of an electronic device in accordance with one embodiment of the present disclosure.

Turning to FIG. 11D, FIG. 11D is a simplified schematic diagram illustrating an embodiment of electronic device 10b, in accordance with one embodiment of the present disclosure. As illustrated in FIG. 11D, second housing 14a can function as a stand that provides support for display portion 48. The angle of second housing 14a can be configured to provide a user desired viewing angle of display 54 and user desired viewing angle of second housing display 44.

Figure 11E:
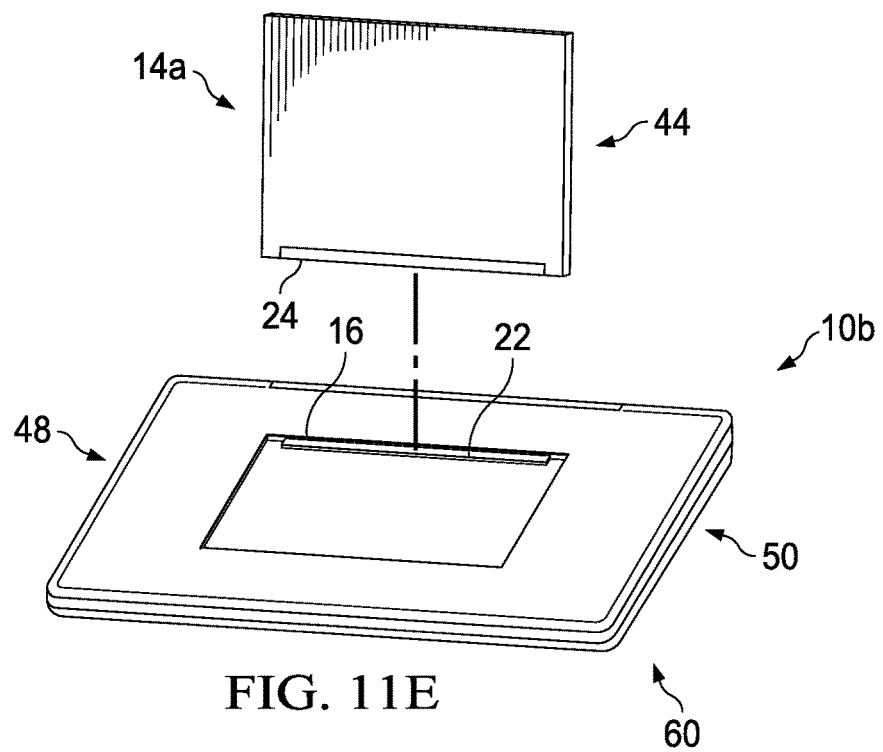
FIG. 11E is a simplified schematic diagram illustrating an embodiment of an electronic device in accordance with one embodiment of the present disclosure.

Turning to FIG. 11E, FIG. 11E is a simplified schematic diagram illustrating an embodiment of electronic device 10b, in accordance with one embodiment of the present disclosure. As illustrated in FIG. 11E, second housing 14a has been removed from display portion 48. Second housing 14a may be replaced with another second housing (e.g., second housing 14b-g illustrated in FIGS. 5-10) as described above.

Figure 12:
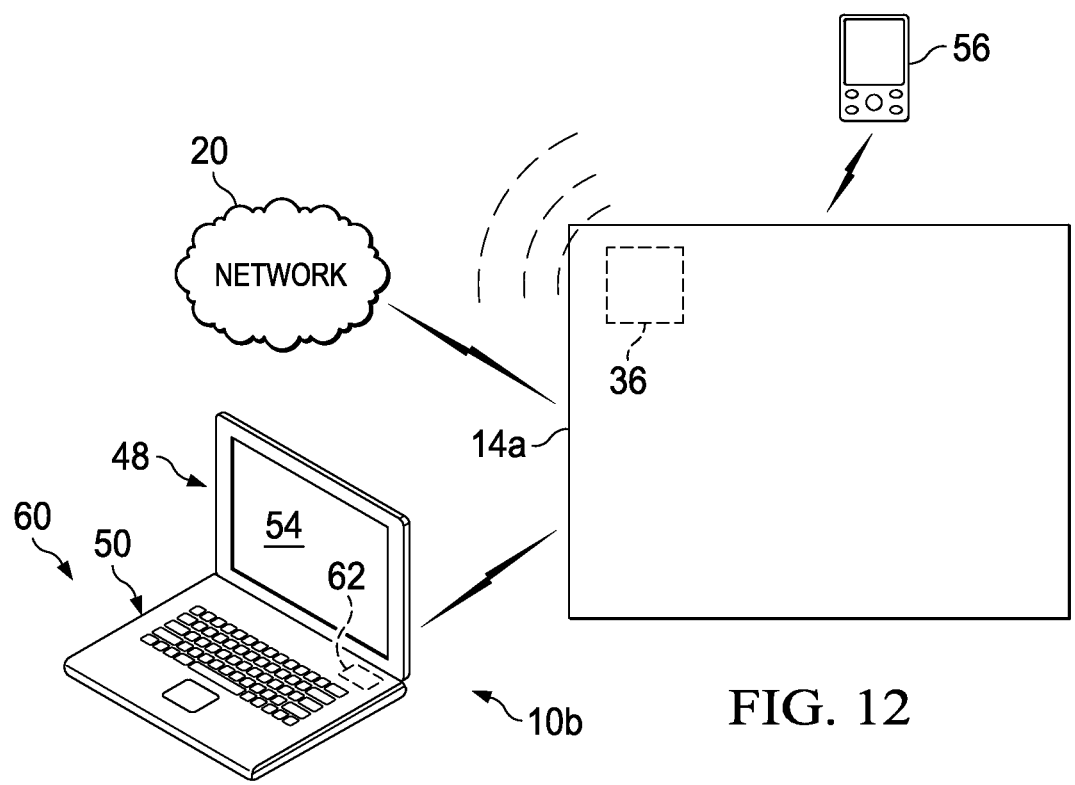
FIG. 12 is a simplified schematic diagram illustrating an embodiment of an electronic device in accordance with one embodiment of the present disclosure.

Turning to FIG. 12, FIG. 12 is a simplified block diagram illustrating an embodiment of electronic device 10b in accordance with one embodiment of the present disclosure. Second housing 14a may include wireless module 36. Wireless module 36 (e.g., Wi-Fi module, Bluetooth module, WiDi module, or other wireless communication circuitry) allows second housing 14a to communicate with base device 60 (or first housing 12) when second housing 14a is removed from display portion 48 (or first housing 12). Base device 60 can include a base wireless module 62. Wireless module 36 may also allow second housing 14a to communicate with network 20 and a second electronic device 56 through a wireless connection.

The wireless connection may be any 3G/4G/LTE cellular wireless, WiFi/WiMAX connection, WiDi connection, or some other similar wireless connection. In an embodiment, the wireless connection may be a wireless personal area network (WPAN) to interconnect second housing 14a to base device 60, network 20, or second electronic device 56 within a relatively small area (e.g., Bluetooth™, invisible infrared light, Wi-Fi, WiDi, etc.). In another embodiment, the wireless connection may be a wireless local area network (WLAN) that links second housing 14a to base device 60, network 20, or second electronic device 56 over a relatively short distance using a wireless distribution method, usually providing a connection through an access point for Internet access. The use of spread-spectrum or OFDM technologies may allow second housing 14a to move around within a local coverage area, and still remain connected to base device 60, network 20, or second electronic device 56.

Network 20 may be a series of points or nodes of interconnected communication paths for receiving and transmitting packets of information that propagate through network 20. Network 20 offers a communicative interface and may be any local area network (LAN), wireless local area network (WLAN), metropolitan area network (MAN), Intranet, Extranet, WAN, virtual private network (VPN), or any other appropriate architecture or system that facilitates communications in a network environment. Network 20 can comprise any number of hardware or software elements coupled to (and in communication with) each other through a communications medium. Second electronic device 56 may be a computer (e.g., notebook computer, laptop, tablet computer or device), a phablet, a cellphone, a personal digital assistant (PDA), a smartphone, an audio system, a movie player of any type, router, access point, or other device that includes a circuit board coupled to a plurality of electronic components (which includes any type of components, elements, circuitry, etc.).

Figure 13:
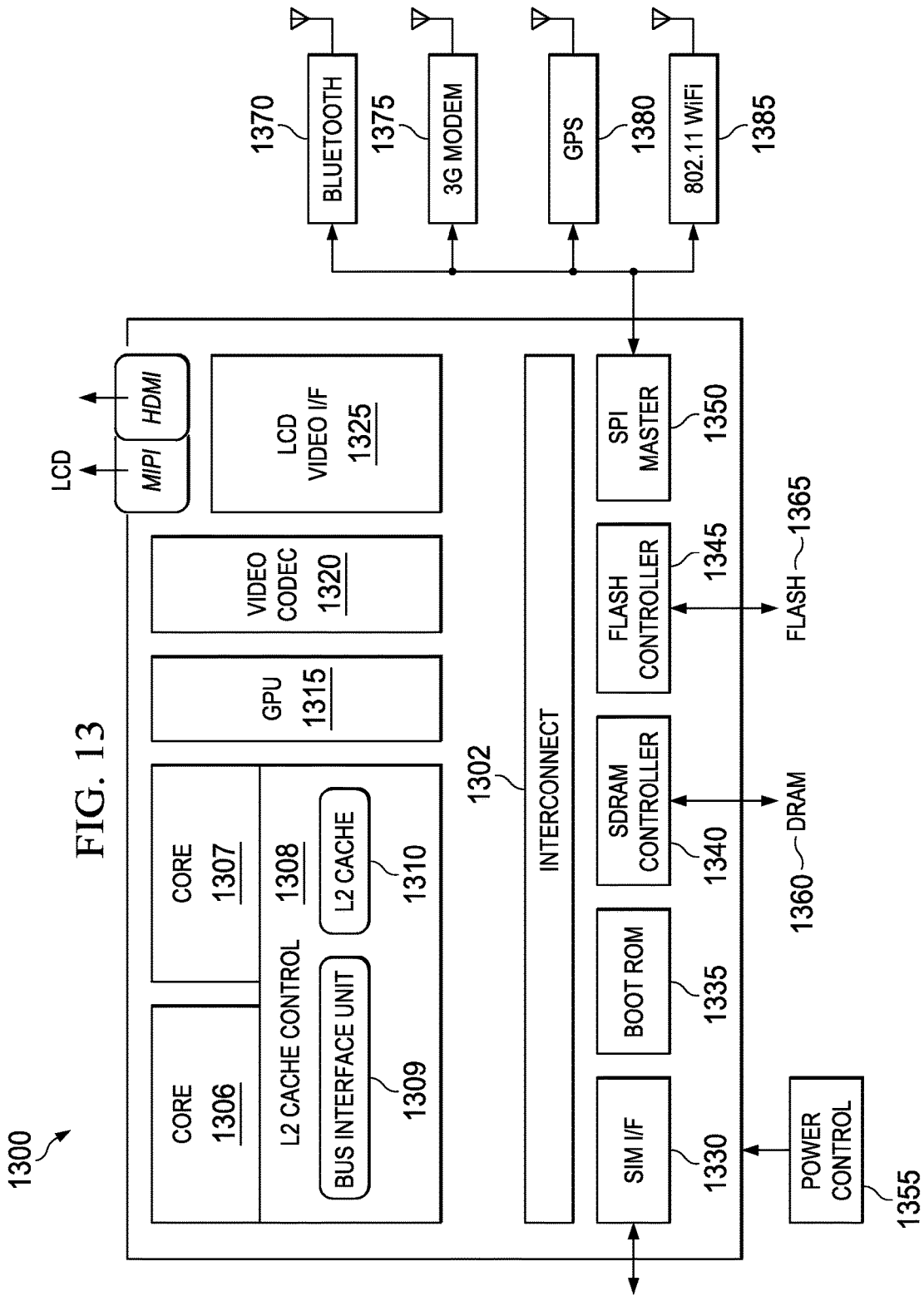
FIG. 13 is a simplified block diagram associated with an example ARM ecosystem system on chip (SOC) of the present disclosure.

Turning to FIG. 13, FIG. 13 is a simplified block diagram associated with an example ARM ecosystem SOC 1300 of the present disclosure. At least one example implementation of the present disclosure can include the modular second housing features discussed herein and an ARM component. For example, the example of FIG. 13 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 13, ARM ecosystem SOC 1300 may include multiple cores 1306-1307, an L2 cache control 1308, a bus interface unit 1309, an L2 cache 1310, a graphics processing unit (GPU) 1315, an interconnect 1302, a video codec 1320, and a liquid crystal display (LCD) I/F 1325, which may be associated with mobile industry processor interface (MIPI)/high-definition multimedia interface (HDMI) links that couple to an LCD.

ARM ecosystem SOC 1300 may also include a subscriber identity module (SIM) I/F 1330, a boot read-only memory (ROM) 1335, a synchronous dynamic random access memory (SDRAM) controller 1340, a flash controller 1345, a serial peripheral interface (SPI) master 1350, a suitable power control 1355, a dynamic RAM (DRAM) 1360, and flash 1365. In addition, one or more example embodiments include one or more communication capabilities, interfaces, and features such as instances of Bluetooth™ 1370, a 3G modem 1375, a global positioning system (GPS) 1380, and an 802.11 Wi-Fi 1385.

In operation, the example of FIG. 13 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 14:
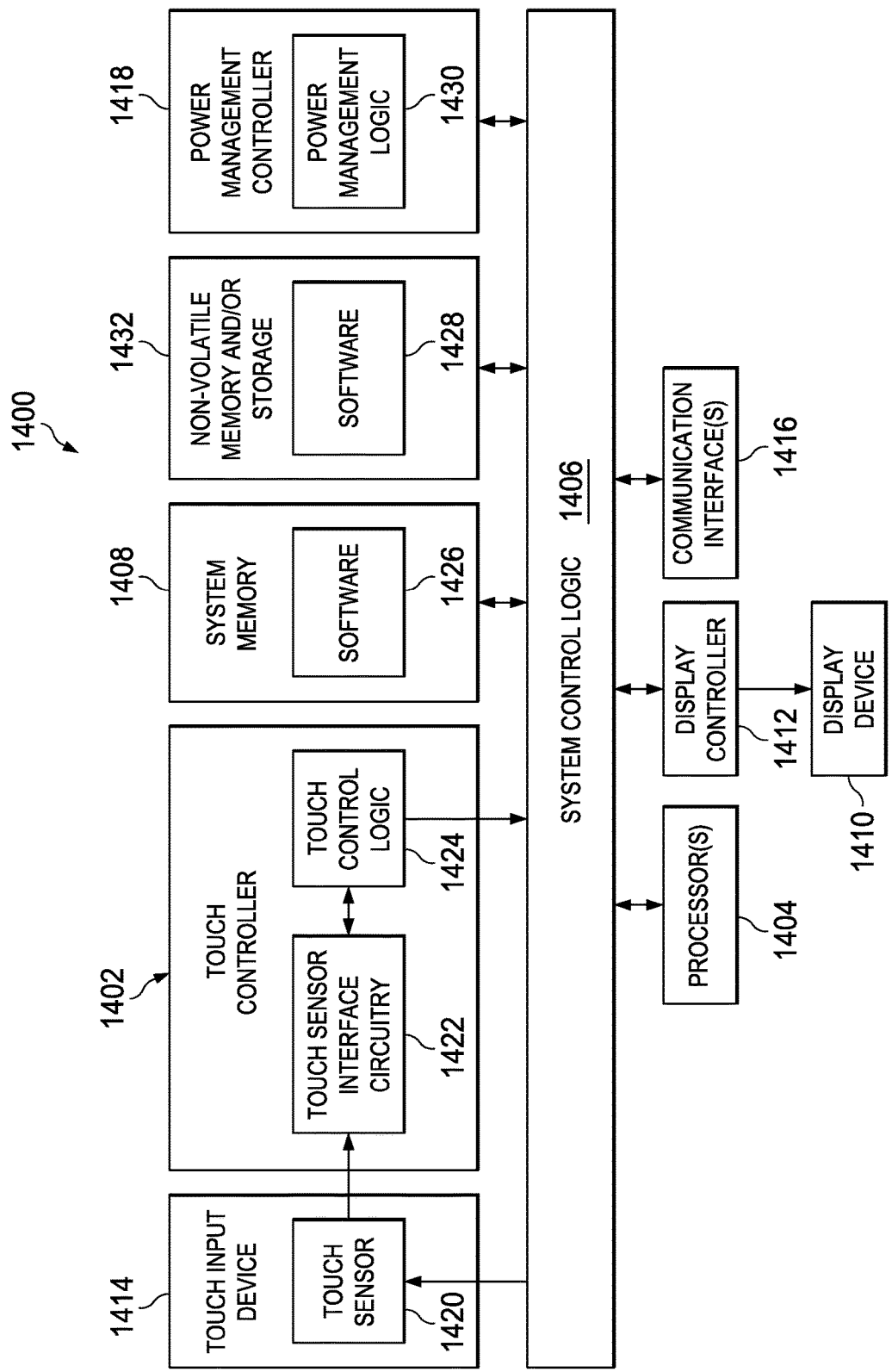
FIG. 14 is a simplified block diagram illustrating example logic that may be used to execute activities associated with the present disclosure.

Turning to FIG. 14, FIG. 14 is a simplified block diagram illustrating potential electronics and logic that may be associated with any of the electronic devices discussed herein. In at least one example embodiment, system 1400 can include a touch controller 1402, one or more processors 1404, system control logic 1406 coupled to at least one of processor(s) 1404, system memory 1408 coupled to system control logic 1406, non-volatile memory and/or storage device(s) 1432 coupled to system control logic 1406, display controller 1412 coupled to system control logic 1406, display controller 1412 coupled to a display device 1410, power management controller 1418 coupled to system control logic 1406, and/or communication interfaces 1416 coupled to system control logic 1406.

System control logic 1406, in at least one embodiment, can include any suitable interface controllers to provide for any suitable interface to at least one processor 1404 and/or to any suitable device or component in communication with system control logic 1406. System control logic 1406, in at least one example embodiment, can include one or more memory controllers to provide an interface to system memory 1408. System memory 1408 may be used to load and store data and/or instructions, for example, for system 1400. System memory 1408, in at least one example embodiment, can include any suitable volatile memory, such as suitable dynamic random access memory (DRAM) for example. System control logic 1406, in at least one example embodiment, can include one or more I/O controllers to provide an interface to display device 1410, touch controller 1402, and non-volatile memory and/or storage device(s) 1432.

Non-volatile memory and/or storage device(s) 1432 may be used to store data and/or instructions, for example within software 1428. Non-volatile memory and/or storage device(s) 1432 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1418 may include power management logic 1430 configured to control various power management and/or power saving functions disclosed herein or any part thereof. In at least one example embodiment, power management controller 1418 is configured to reduce the power consumption of components or devices of system 1400 that may either be operated at reduced power or turned off when the electronic device is in a closed configuration. For example, in at least one example embodiment, when the electronic device is in a closed configuration, power management controller 1418 performs one or more of the following: power down the unused portion of the display and/or any backlight associated therewith; allow one or more of processor(s) 1404 to go to a lower power state if less computing power is required in the closed configuration; and shutdown any devices and/or components that are unused when an electronic device is in the closed configuration.

Communications interface(s) 1416 may provide an interface for system 1400 to communicate over one or more networks and/or with any other suitable device. Communications interface(s) 1416 may include any suitable hardware and/or firmware. Communications interface(s) 1416, in at least one example embodiment, may include, for example, a network adapter, a wireless network adapter, a telephone modem, and/or a wireless modem.

System control logic 1406, in at least one example embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 1404 may be packaged together with logic for one or more controllers of system control logic 1406. In at least one example embodiment, at least one processor 1404 may be packaged together with logic for one or more controllers of system control logic 1406 to form a System in Package (SiP). In at least one example embodiment, at least one processor 1404 may be integrated on the same die with logic for one or more controllers of system control logic 1406. For at least one example embodiment, at least one processor 1404 may be integrated on the same die with logic for one or more controllers of system control logic 1406 to form a System on Chip (SoC).

For touch control, touch controller 1402 may include touch sensor interface circuitry 1422 and touch control logic 1424. Touch sensor interface circuitry 1422 may be coupled to detect touch input over a first touch surface layer and a second touch surface layer of a display (i.e., display device 1410). Touch sensor interface circuitry 1422 may include any suitable circuitry that may depend, for example, at least in part on the touch-sensitive technology used for a touch input device. Touch sensor interface circuitry 1422, in one embodiment, may support any suitable multi-touch technology. Touch sensor interface circuitry 1422, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1424 may be coupled to help control touch sensor interface circuitry 1422 in any suitable manner to detect touch input over a first touch surface layer and a second touch surface layer. Touch control logic 1424 for at least one example embodiment may also be coupled to output in any suitable manner digital touch input data corresponding to touch input detected by touch sensor interface circuitry 1422. Touch control logic 1424 may be implemented using any suitable logic, including any suitable hardware, firmware, and/or software logic (e.g., non-transitory tangible media), that may depend, for example, at least in part on the circuitry used for touch sensor interface circuitry 1422. Touch control logic 1424 for at least one embodiment may support any suitable multi-touch technology.

Touch control logic 1424 may be coupled to output digital touch input data to system control logic 1406 and/or at least one processor 1404 for processing. At least one processor 1404 for at least one embodiment may execute any suitable software to process digital touch input data output from touch control logic 1424. Suitable software may include, for example, any suitable driver software and/or any suitable application software. As illustrated in FIG. 14, system memory 1408 may store suitable software 1426 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., number, location, height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example A1 is an electronic device that includes a first housing and a second housing. The second housing can be removably coupled to the first housing and the second housing can be configured to function as a stand for the first housing.

In Example A2, the subject matter of Example A1 may optionally include where the first housing includes a first display and the second housing includes a second display.

In Example A3, the subject matter of any of the preceding 'A' Examples can optionally include where the stand configuration allows for user desired viewing of the first display and of the second display.

In Example A4, the subject matter of any of the preceding 'A' Examples can optionally include where the first housing is a standalone tablet.

In Example A5, the subject matter of any of the preceding 'A' Examples can optionally include where the electronic device also includes an interconnect to electrically couple the first housing and the second housing.

In Example A6, the subject matter of any of the preceding 'A' Examples can optionally include where the second housing can be removed from the first housing and replaced with a different second housing, where the different second housing uses the same interconnect as the second housing.

In Example A7, the subject matter of any of the preceding 'A' Examples can optionally include where the different second housing does not include any electronics.

In Example A8, the subject matter of any of the preceding 'A' Examples can optionally include where the second housing is a standalone electronic device.

Example AA1 is an electronic device that includes a first housing, where the first housing includes a first display, and a second housing removably coupled to the first housing. The second housing includes a second display and is configured to function as a stand for the first housing such that the stand configuration allows for user desired viewing of the first display and of the second display.

In Example AA2, the subject matter of Example AA1 may optionally include an interconnect to electrical couple the first housing and the second housing.

In Example AA3, the subject matter of any of the preceding 'AA' Examples can optionally include where the second housing can be removed from the first housing and replaced with a different second housing, where the different second housing uses the same interconnect as the second housing.

In Example AA4, the subject matter of any of the preceding 'AA' Examples can optionally include where the different second housing does not include any electronics.

In Example AA5, the subject matter of any of the preceding 'AA' Examples can optionally include where the first housing is a standalone tablet.

In Example AA6, the subject matter of any of the preceding 'AA' Examples can optionally include where the second housing is a standalone electronic device.

Example M1 is a method that includes rotating a second housing away from a first housing on a hinge, where the first housing includes a first display and the second housing includes a second display and adjusting the angle of rotation such that the second housing acts as a stand for the first housing and allows for user desired viewing of the first display and of the second display.

In Example M2, the subject matter of any of the preceding 'M' Examples can optionally include where the first housing is a standalone tablet.

In Example M3, the subject matter of any of the preceding 'M' Examples can optionally include removing the second housing from the first housing, where an interconnect electrically couples the first housing and the second housing.

In Example M4, the subject matter of any of the preceding 'M' Examples can optionally include where the second housing is a standalone tablet.

In Example M5, the subject matter of any of the preceding 'M' Examples can optionally include replacing the second housing with a different second housing, where the different second housing uses the same interconnect as the second housing.

In Example M6, the subject matter of any of the preceding 'M' Examples can optionally include where the different second housing does not include any electronics.

In Example M7, the subject matter of any of the preceding 'M' Examples can optionally include where different second housing is configured to function as a power supply, a camera, a video recorder, or a sound system.

Example S1 is a system that includes means for rotating a second housing away from a first housing, where the first housing includes a first display and the second housing includes a second display and means for adjusting the angle of rotation such that the second housing acts as a stand for the first housing and allows for proper viewing of the first display and of the second display.

In Example S2, the subject matter of 'S1' can may optionally include where the first housing is a standalone tablet.

In Example S3, the subject matter of any of the preceding 'SS' Examples can optionally include where means for removing the second housing from the first housing, where an interconnect electrically couples the first housing and the second housing.

In Example S4, the subject matter of any of the preceding 'SS' Examples can optionally means for replacing the second housing with a different second housing, where the different second housing uses the same interconnect as the second housing.

In Example S5, the subject matter of any of the preceding 'SS' Examples can optionally include where the different second device does not include any electronics.

In Example S6, the subject matter of any of the preceding 'S' Examples can optionally include where the second housing is a standalone electronic device.

Example X1 is a machine-readable storage medium including machine-readable instructions to implement a method or realize an apparatus as in any one of the Examples A1-A8, AA1-AA4, and M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
a first housing, wherein the first housing includes a body;
a second housing with a keyboard rotatably coupled to a distal end of the first housing using a first hinge; and
a third housing removably coupled to the first housing using a second hinge with a rotation means to limit a rotation angle to less than ninety (90) degrees, wherein the third housing is configured to function as a stand for the first housing, wherein the first housing includes a first display visible from a first direction and the third housing includes a second display visible from a second direction, wherein the first direction is opposite the second direction,
wherein the second hinge is located around a middle portion of the body of the first housing between the first hinge and a top edge of the first housing.

2. The electronic device of claim 1, wherein the stand configuration allows for user desired viewing of the first display and of the second display.

3. The electronic device of claim 2, wherein the first housing is a standalone tablet.

4. The electronic device of claim 1, further comprising:
an interconnect to electrically couple the first housing and the third housing.

5. The electronic device of claim 4, wherein the third housing can be removed from the first housing and replaced with a different third housing.

6. The electronic device of claim 3, wherein the third housing is a standalone electronic device.

7. An electronic device, comprising:
a first housing, wherein the first housing includes a body and a first display facing a first direction;

a second housing rotatably coupled to a distal end of the first housing using a first hinge, wherein the second housing includes a keyboard; and a third housing removably coupled to the first housing using a second hinge with a rotation means to limit a rotation angle to less than ninety (90) degrees, wherein the third housing includes a second display, wherein the third housing is configured to function as a stand for the first housing such that the stand configuration allows for the first display to be visible from a first direction and the second display to be visible from a second direction, wherein the first direction is opposite the second direction wherein the second hinge is located around a middle portion of the body of the first housing between the first hinge and a top edge of the first housing.

8. The electronic device of claim 7, further comprising:
an interconnect to electrical couple the first housing and the third housing.

9. The electronic device of claim 8, wherein the third housing can be removed from the first housing and replaced with a different third housing.

10. The electronic device of claim 9, wherein the first housing is a standalone tablet.

11. The electronic device of claim 10, wherein the third housing is a standalone electronic device.

12. A system, comprising:
a first hinge for rotating a second housing away from a first housing, wherein the first hinge is coupled to a distal end of the first housing, wherein the first housing includes a body and a first display visible from a first direction, wherein the second housing includes a keyboard; and a second hinge with a rotation means to limit a rotation angle less to than ninety (90) degrees, wherein the second hinge rotatably couples a third housing to the first housing, wherein the second hinge is located around a middle portion of the body of the first housing between the first hinge and a top edge of the first housing, wherein the third housing includes a second display to be visible from a second direction, wherein the first direction is opposite the second direction, wherein the hinge is configured for adjusting the angle of rotation of the third housing such that the third housing acts as a stand for the first housing and allows for user desired viewing of the first display and of the second display.

13. The system of claim 12, wherein the first housing is a standalone tablet.

14. The system of claim 12, wherein the hinge is configured to allow for removing the third housing from the first housing, wherein an interconnect electrically couples the first housing and the third housing.

15. The system of claim 14, wherein the hinge is configured to allow for replacing the third housing with a different third housing.

16. The system of claim 13, wherein the third housing is a standalone electronic device.

17. The electronic device of claim 1, wherein the third housing includes a depth sensor.

18. The electronic device of claim 5, wherein the different third housing includes a depth sensor.

19. The electronic device of claim 1, wherein the third housing can be stored in a recessed portion of the body of the first housing in a storage configuration.

20. The electronic device of claim 19, wherein in the storage configuration, the first housing has a relatively flat profile.

* * * * *

UNITED STATES PATENT AND TRADEMARK OFFICE
CERTIFICATE OF CORRECTION

PATENT NO. : 9,729,683 B2
APPLICATION NO. : 14/498812
DATED : August 8, 2017
INVENTOR(S) : James M. Okuley It is certified that error appears in the above-identified patent and that said Letters Patent is hereby corrected as shown below:

In the Claims

In Column 15, Line 35, in Claim 12, delete "less to than" and insert -- to less than --, therefor.

Signed and Sealed this
Thirty-first Day of October, 2017

Joseph Matal
*Performing the Functions and Duties of the
Under Secretary of Commerce for Intellectual Property and
Director of the United States Patent and Trademark Office*